United States Patent
Lin et al.

(10) Patent No.: US 9,122,960 B2
(45) Date of Patent: Sep. 1, 2015

(54) PATCH SIZE ADAPTATION FOR IMAGE ENHANCEMENT

(71) Applicant: Adobe Systems Incorporated, San Jose, CA (US)

(72) Inventors: Zhe Lin, Fremont, CA (US); Xin Lu, University Park, PA (US); Jonathan Brandt, Santa Cruz, CA (US); Hailin Jin, Campbell, CA (US)

(73) Assignee: Adobe Systems Incorporated, San Jose, CA (US)

( * ) Notice: Subject to any disclaimer, the term of this patent is extended or adjusted under 35 U.S.C. 154(b) by 278 days.

(21) Appl. No.: 13/691,212

(22) Filed: Nov. 30, 2012

(65) Prior Publication Data

US 2014/0153817 A1   Jun. 5, 2014

(51) Int. Cl.
*G06K 9/00* (2006.01)
*G06K 9/62* (2006.01)
*G06K 9/40* (2006.01)
*G06K 9/68* (2006.01)
*G06T 5/00* (2006.01)

(52) U.S. Cl.
CPC . *G06K 9/68* (2013.01); *G06T 5/001* (2013.01); *G06T 2207/20021* (2013.01)

(58) Field of Classification Search
None
See application file for complete search history.

(56) References Cited

U.S. PATENT DOCUMENTS

| | | | |
|---|---|---|---|
| 2001/0002932 A1* | 6/2001 | Matsuo et al. | 382/118 |
| 2003/0156757 A1* | 8/2003 | Murakawa et al. | 382/195 |
| 2005/0281459 A1* | 12/2005 | Bala et al. | 382/162 |
| 2011/0206296 A1* | 8/2011 | Sakaguchi et al. | 382/299 |
| 2012/0307116 A1* | 12/2012 | Lansel et al. | 348/273 |

OTHER PUBLICATIONS

Kervrann, Charles, Jérôme Boulanger, and Pierrick Coupé. "Bayesian non-local means filter, image redundancy and adaptive dictionaries for noise removal." Scale Space and Variational Methods in Computer Vision. Springer Berlin Heidelberg, 2007. 520-532.*

Dabov, et al., "Image denoising by sparse 3D transform-domain collaborative," accepted. to appear in IEEE Transactions on Image Processing, vol. 16, No. 8, Aug. 2007, pp. 1-16.

Freeman, et al al., "Example-Based Super-Resolution," Image-Based Modeling, Rendering, and Lighting, Mitsubishi Electric Research Labs, Mar.-Apr. 2002, pp. 56-65.

Joshi, et al., "Personal Photo Enhancement Using Example Images," ACM Transactions on Graphics, 29(2), Article 12, Mar. 2010, pp. 1-15.

(Continued)

*Primary Examiner* — Thomas Conway
(74) *Attorney, Agent, or Firm* — Kilpatrick Townsend & Stockton LLP

(57) ABSTRACT

Systems and methods are provided for providing patch size adaptation for patch-based image enhancement operations. In one embodiment, an image manipulation application receives an input image. The image manipulation application compares a value for an attribute of at least one input patch of the input image to a threshold value. Based on comparing the value for the to the threshold value, the image manipulation application adjusts a first patch size of the input patch to a second patch size that improves performance of a patch-based image enhancement operation as compared to the first patch size. The image manipulation application performs the patch-based image enhancement operation based on one or more input patches of the input image having the second patch size.

20 Claims, 8 Drawing Sheets

(56) References Cited

OTHER PUBLICATIONS

Kervrann, et al., "Optimal Spatial Adaptation for Patch-Based Image Denoising," IEEE Transactions on Image Processing, 15(10), Oct. 2006, pp. 2866-2878.

Roth, et al., "Fields of Experts," International Journal of Computer Vision, Accepted Nov. 17, 2008, pp. 1-25.

Tomasi, et al., "Bilateral Filtering for Gray and Color Images," Proceedings of the 1998 IEEE International Conference on Computer Vision, Bombay, India, 1998, pp. 8.

Yang, et al., "Couple Dictionary Training for Image Super-Resolution.", IEEE Transactions on Image Processing, Mar. 13, 2012, pp. 1-27.

Notice of Allowance in related U.S. Appl. No. 13/691,190 dated Apr. 20, 2015, 17 pages.

* cited by examiner

PATCH SIZE ADAPTATION FOR IMAGE ENHANCEMENT

CROSS-REFERENCE TO RELATED APPLICATION

U.S. patent application Ser. No. 13/691,190, entitled "Learned Piece-Wise Patch Regression for Image Enhancement", filed on the same day as the present application and naming Zhe Lin, Xin Lu, Jonathan Brandt, and Hailin Jin as inventors, is incorporated by reference herein in its entirety.

TECHNICAL FIELD

This disclosure relates generally to computer-implemented methods and systems and more particularly relates to providing patch size adaptation for patch-based image enhancement operations.

BACKGROUND

Image manipulation programs are used to modify or otherwise use image content captured using a camera. For example, an image manipulation program can remove or decrease noise from (i.e., de-noise) image content captured using the camera. An image manipulation program can also remove or decrease blurring in image content captured using the camera. Noise can be caused by, for example, capturing images in low light conditions with low-end cameras. Low-end cameras may include image sensors having a high sensitivity to light conditions. Increasing the sensitivity to light conditions can add noise to image content captured with the camera.

Existing solutions for de-noising image content can improve the quality of image content. One existing solution is a non-local means algorithm. A non-local means algorithm can average pixel values in image patches (i.e., portions of the input image) of a noisy image using weighted averages. The non-local means algorithm can identify a given patch of the noisy image as a subject patch. Pixel values are averaged for image patches that are similar to the subject image patch. Averaging the pixel values can reduce the effect of noise in the input image.

Another existing solution is a block-matching and three-dimensional filtering ("BM3D") algorithm that groups similar patches and performs collaborative filtering. A BM3D algorithm selects all similar patches for an input image and divides the similar patches into groups. For each group, collaborative filtering is performed. A "clean" (i.e., de-noised) image can be re-constructed from the filtered patches.

However, among other deficiencies, existing solutions for de-noising or other image enhancement operation use a fixed patch size for all regions of an input image. Using a fixed patch size that is too large can prevent non-local means and/or BM3D algorithms from finding enough similar patches in the vicinity of a target patch to perform accurate de-noising. Using a fixed patch size that is too small can cause inefficient processing of uniform image regions.

SUMMARY

One embodiment involves receiving an input image. The embodiment further involves comparing a value for an attribute of at least one input patch of the input image to a threshold value. The embodiment further involves, based on comparing the value for the patch to the threshold value, adjusting a first patch size of the input patch to a second patch size that improves performance of a patch-based image enhancement operation as compared to the first patch size. The embodiment further involves performing the patch-based image enhancement operation based on one or more input patches of the input image having the second patch size.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
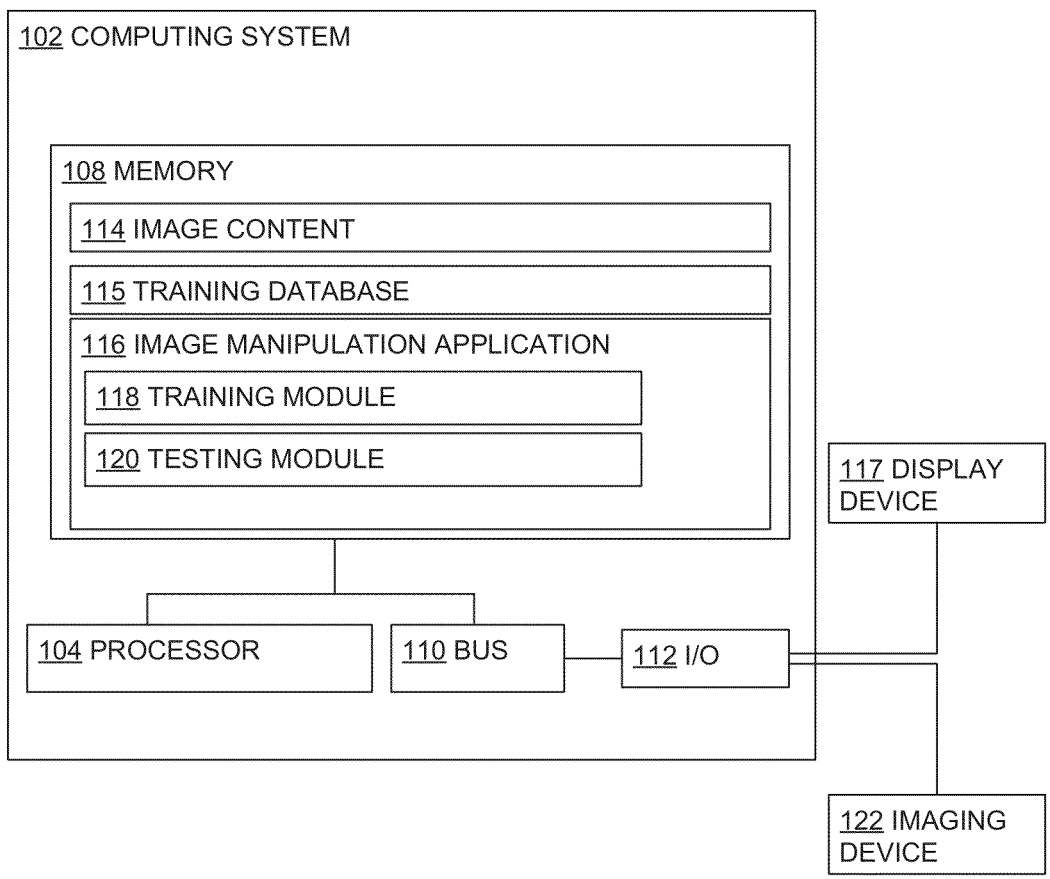
FIG. 1 is a block diagram depicting an example computing system for implementing certain embodiments.

Computer-implemented systems and methods are disclosed for providing patch size adaptation for patch-based image enhancement. For example, an image manipulation application can perform patch size adaptation to improve patch-based image enhancement algorithms such as (but not limited to) de-noising algorithms. Patch size adaptation includes selecting an image patch size from two or more image patch sizes based on analyzing at least one attribute of an input patch of an input image. For example, an image manipulation application can analyze one or more input patches from an input image, such as a photograph of a building. A first patch size can be 10 pixels×10 pixels and a second patch size can be 5 pixels×5 pixels. The input image can include regions that are uniform or have simple structures and regions that include variance in features. A non-limiting example of a uniform region is an image region depicting a white wall of the building. A non-limiting example of a region having simple structures is an image region depicting a single line of edges, such as the top edge of the building. A non-limiting example of a region having variance in features is an image region depicting a portion of the building including an entrance, signs, multiple windows, etc. The image manipulation application automatically selects a patch size of 10 pixels×10 pixels to enhance image regions that are uniform or have simple structures, thereby preventing noise in the uniform areas from being misinterpreted as a feature by an image enhancement algorithm. The image manipulation application automatically selects a patch size of 5 pixels×5 pixels to enhance image regions that include more variance in features, thereby de-blurring or otherwise restoring details of the input image obscured by noise.

Using different patch sizes for different types of image regions can improve the performance of patch-based de-noising algorithms in different image regions. Using larger patches can be more effective in removing or reducing noise in image regions that are uniform or have simple structures. Using smaller patches can be more effective in removing or reducing noise in regions having more details and/or variation in features. In one example, an image enhancement algorithm using an insufficiently large patch size for image regions such as uniform regions or regions with simple structures may mistakenly interpret noise as a feature. In another example, an image enhancement algorithm executing a single de-noising operation based on a single larger image patch may be more efficient than an algorithm executing multiple instances of a de-noising operation based on multiple smaller image patches.

In accordance with one embodiment, an image manipulation application receives an input image. The image manipulation application compares a value for an attribute of at least one input patch of the input image to a threshold value. For example, an attribute of an input patch may be a number of patches having similar pixel values within a given distance of the input patch. A threshold value may be a minimum number of patches having the similar pixel values within the given distance of the input patch. Based on comparing the value for the input patch to the threshold value, the image manipulation application determines that adjusting a patch size of the input patch may improve performance of a patch-based image enhancement operation. For example, the image manipulation application may determine that the patch size should be adjusted from a first patch size to a second patch size smaller than the first patch size to improve de-noising of a region of the input image having a large variance in features. The image manipulation application selects a second patch size based on determining that the first patch size should be adjusted to improve performance of a patch-based image enhancement operation. The image manipulation application performs the patch-based image enhancement operation based on one or more input patches of the input image having the second patch size. For example, the image manipulation application may sub-divide an image patch having a patch size of 10 pixels×10 pixels patches into multiple image patches, each having a patch size of 5 pixels×5 pixels. The image manipulation application performs the patch-based image enhancement operation on each of the smaller patches.

As used herein, the term "patch" is used to refer to a partitioned portion of image content. An image can be partitioned into multiple patches of equal size that overlap one another. Non-limiting examples of patch sizes include 5 pixels×5 pixels, 7 pixels×7 pixels, and 10 pixels×10 pixels. A patch can be a square patch or any other suitable shape for image processing. A suitable patch size can provide a pixel-level correspondence between a training input patch, such as a noisy patch, and a training output patch, such as a clean patch having little or no noise distortion.

As used herein, the term "image content" is used to refer to any image that can be rendered for display or use at a computing system or other electronic device. Image content can include still images, video, or any combination thereof.

As used herein, the term "noise" is used to refer to random data added to image content that distorts the image content. Noise can be added to image content due to thermal noise or other noise experienced by an optical sensor of an imaging device, such as a camera.

As used herein, the term "patch-based image enhancement algorithm" is used to refer to any algorithm for improving the quality of an image that uses one or more image patches as inputs. In some embodiments, a patch-based image enhancement algorithm can remove noise from an image. In other embodiments, a patch-based image enhancement algorithm can up-sample a low-resolution image to generate a high-resolution image.

In some embodiments, the image manipulation application can perform piece-wise patch regression for image enhancement, as described in U.S. patent application Ser. No. 13/691,190. The image manipulation application can be trained to de-noise input images using a training input image and a training output image. The training input image and the training output image include at least some of the same image content. Training the image manipulation application using training sets of patches can allow the image manipulation application to apply patch-based image enhancement algorithms to a new input image. The image manipulation application can partition training input patches from a training input image into a first set of groups of training input patches based on the first patch size. Using adaptive patch sizing can allow the image manipulation application to adapt to different types of input images, such as some input images having either uniform image regions or other input images having highly detailed image regions.

For example, the image manipulation application can partition training input patches from the training input image into a second set of groups of training input patches based on the second patch size. The image manipulation application can identify a first set of anchor points for the first set of groups and a second set of anchor points for the second set of groups. Each anchor point represents a respective group of training input patches. The image manipulation application can determine a respective patch-pair function for each anchor point in the first set of anchor points and the second sect of anchor points. Each patch-pair function corresponds to a modification to a respective training input patch to generate a respective training output patch for the training output image. For a given input patch of an input image, the image manipulation application can compare a distance between the input patch and a closest anchor point with a threshold distance. The image manipulation application can select the first set of anchor points if the distance between the input patch and a closest anchor point is less than a threshold distance. The image manipulation application can select the second set of anchor points if the distance between the input patch and a closest anchor point is greater than a threshold distance. The image manipulation application can sub-divide the at least one input patch into multiple sub-divided input patches. Each of the sub-divided input patches has the second patch size. For each of the sub-divided input patches, the image manipulation application can identify a respective anchor point corresponding to the sub-divided input patch, identify a respective patch-pair function for the respective anchor point, and apply the respective patch-pair function based on the sub-divided input patch. Using a smaller patch size can allow the image manipulation application to select an anchor point having characteristics more similar to the input patch. Selecting an anchor point having characteristics more similar to the input patch can allow the image manipulation application to select a corresponding patch-pair function that can provide more effective image enhancement of the input image patch.

In additional or alternative embodiments, the image manipulation application can perform patch size adaptation for improving a de-noising algorithm such as non-local means de-noising algorithm or a block-matching and three-dimensional filtering ("BM3D") algorithm. Non-local means de-noising algorithms and BM3D algorithms can select a target image patch and analyze nearby target image patches, such as adjacent image patches or image patches within a pre-determined distance to the target image patch. A weighted average can be calculated for one or more pixel values of the nearby image patches, such as each center pixel value of a respective nearby image patch. One or more corresponding pixel values of the target image patch can be set to the weighted average value. In some embodiments, the similarity between a target patch and nearby patches can be an attribute for analyzing an input patch prior to performing a non-local means de-noising algorithm or a BM3D algorithm. The image manipulation application can search for larger patches having similar pixel values. If the image manipulation application finds a number of larger patches having similar pixel values that is greater than a threshold number, the image manipulation application can de-noise the target patch by executing a non-local means de-noising algorithm or a BM3D algorithm. If the image manipulation application finds a number of larger patches having similar pixel values that is less than a threshold number, the image manipulation application can divide the image region in which the target patch is located into a number of smaller patches. Dividing the image region in which the input patch is located into a number of smaller patches can allow the image application to use a suitable number of similar patches for de-noising the target patch by executing a non-local means de-noising algorithm or a BM3D algorithm. In other embodiments, the distance between a target patch and nearby patches can be an attribute for analyzing an input patch prior to performing a non-local means de-noising algorithms or a BM3D algorithm.

In additional or alternative embodiments, the image manipulation application can determine a threshold based on a semantic threshold. A semantic threshold can include one or more pixel values corresponding to image features identified by input to the image manipulation application. For example, the image manipulation application can receive input identifying certain features of one or more test images, such as a sky in an outdoor photograph. The image manipulation application can determine a semantic threshold for the feature, such as intensity and/or color values corresponding to a sky. The image manipulation application can be trained or otherwise configured to determine a patch size based on a feature having pixel values exceeding a semantic threshold. For example, the image manipulation application may determine that an input patch has pixel values exceeding a semantic threshold corresponding to a sky. The image manipulation application can select a larger patch size for performing an image enhancement operation on the input patch exceeding the semantic threshold.

Referring now to the drawings, FIG. 1 is a block diagram depicting an example computing system 102 for implementing certain embodiments.

The computing system 102 comprises a computer-readable medium such as a processor 104 that is communicatively coupled to a memory 108 and that executes computer-executable program instructions and/or accesses information stored in the memory 108. The processor 104 may comprise a microprocessor, an application-specific integrated circuit ("ASIC"), a state machine, or other processing device. The processor 104 can include any of a number of computer processing devices, including one. Such a processor can include or may be in communication with a computer-readable medium storing instructions that, when executed by the processor 104, cause the processor to perform the steps described herein.

The computing system 102 may also comprise a number of external or internal devices such as input or output devices. For example, the computing system 102 is shown with an input/output ("I/O") interface 112, a display device 117, and an imaging device 122. A bus 110 can also be included in the computing system 102. The bus 110 can communicatively couple one or more components of the computing system 102.

The computing system 102 can modify, access, or otherwise use image content 114. The image content 114 may be resident in any suitable computer-readable medium and execute on any suitable processor. In one embodiment, the image content 114 can reside in the memory 108 at the computing system 102. In another embodiment, the image content 114 can be accessed by the computing system 102 from a remote content provider via a data network.

A non-limiting example of an imaging device 122 is a camera having an energy source, such as a light emitting diode ("LED"), and an optical sensor. An imaging device 122 can include other optical components, such as an imaging lens, imaging window, an infrared filter, and an LED lens or window. In some embodiments, the imaging device 122 can be a separate device configured to communicate with the computing system 102 via the I/O interface 112. In other embodiments, the imaging device 122 can be integrated with the computing system 102. In some embodiments, the processor 104 can cause the computing system 102 to copy or transfer image content 114 from memory of the imaging device 122 to the memory 108. In other embodiments, the processor 104 can additionally or alternatively cause the computing system 102 to receive image content 114 captured by the imaging device 122 and store the image content 114 to the memory 108.

The memory 108 can include any suitable computer-readable medium. A computer-readable medium may comprise, but is not limited to, electronic, optical, magnetic, or other storage device capable of providing a processor with computer-readable instructions or other program code. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

An image manipulation application 116 stored in the memory 108 can configure the processor 104 to modify the image content 114. In some embodiments, the image manipulation application 116 can be a software module included in or accessible by a separate application executed by the processor 104 that is configured to modify, access, or otherwise use the image content 114. In other embodiments, the image manipulation application 116 can be a stand-alone application executed by the processor 104.

In embodiments such as those described in U.S. patent application Ser. No. 13/691,190, the image manipulation application 116 can include one or more modules, such as (but not limited to) a training module 118 and a testing module 120. The training module 118 can configure the processor 104 to analyze image patch pairs from a training database 115 to determine one or more functions modeling the relationship between training input images and training output images, as described in further detail below. In some embodiments, the training database 115 can be stored in the memory 108, as depicted in FIG. 1. In other embodiments, the training database 115 can be stored at a remote system accessible by the computing system 102 via a data network. The testing module 120 can configure the processor 104 to modify an input image using the one or more functions determined by the training module 118, as described in further detail below.

Although FIG. 1 depicts the training module 118 and the testing module 120 as separate modules, the features provided by one or more of the modules can be provided by a single software module of the image manipulation application 116. Although FIG. 1 depicts the training module 118 and the testing module 120 as modules of the image manipulation application 116, one or more of the training module 118 and the testing module 120 can be separate applications accessed or otherwise used by the image manipulation application 116.

In other embodiments involving other image enhancement algorithms, the training module 118 and the testing module 120 may be omitted.

The computing system 102 can include any suitable computing device for executing the image manipulation application 116. Non-limiting examples of a computing device include a desktop computer, a tablet computer, a smart phone, a digital camera, or any other computing device suitable for rendering the image content 114.

Figure 2:
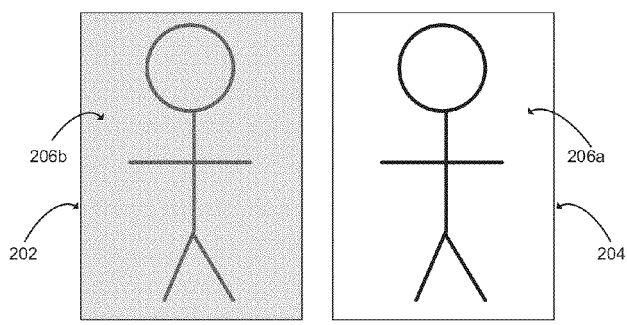
FIG. 2 is a modeling diagram illustrating a training input image and a corresponding training output image.

The training database 115 can include training patch pairs obtained from one or more training input images, as depicted in FIGS. 2-5. FIG. 2 is a modeling diagram illustrating a training input image 202 and a corresponding training output image 204. A non-limiting example of a training input image 202 is a noisy version of a training output image 204. The training output image 204 can include image content 206a. The training input image 204 can include, for example, image content 206b that includes the image content 206a distorted by added noise. For simplicity, the noise in FIG. 2 is depicted as diagonal lines blurring the image content 206b of the training input images 202. However, any modification of the image content 206a, including additive random noise or blurring from a camera shake, can be used with the present innovations.

Figure 3:
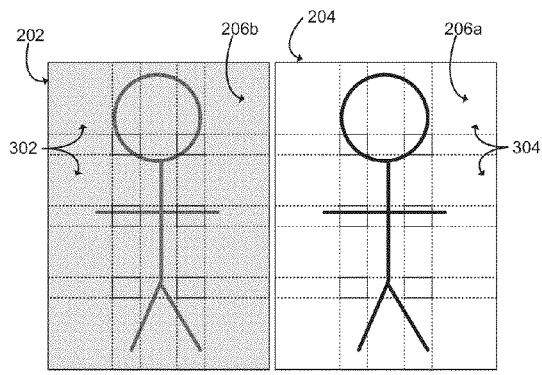
FIG. 3 is a modeling diagram depicting a training input image having training input patches and a training output image having training output patches.
Figure 4:
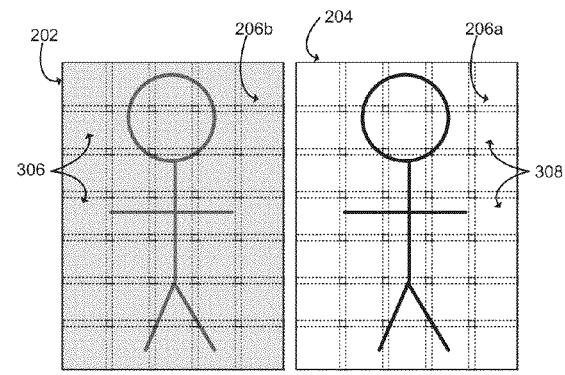
FIG. 4 is a modeling diagram depicting a training input image having training input patches and a training output image having training output patches

FIGS. 3-4 are modeling diagram depicting a training input image 202 having training input patches and a training output image 204 having training output patches. In FIG. 3, each of the training input patches 302 corresponds to a respective one of the training output patches 304. In FIG. 4, each of the training input patches 306 corresponds to a respective one of the training output patches 308. For each set of training input patches 302, 306, the training input patches can overlap one another. For each set of corresponding training output patches 304, 308, the training output patches can overlap one another.

For simplicity, FIG. 3 depicts twelve overlapping patches for each of the training input image 202 and the training output image 204 and FIG. 4 depicts twenty-eight overlapping patches for each of the training input image 202 and the training output image 204. However, an image can be partitioned into any number of patches. For example, an image can be partitioned into overlapping patches of sizes such as 5 pixels×5 pixels, 7 pixels×7 pixels, and 10 pixels×10 pixels. Hundreds, thousands, or millions of patch pairs can be included in a training database 115.

Figure 5:
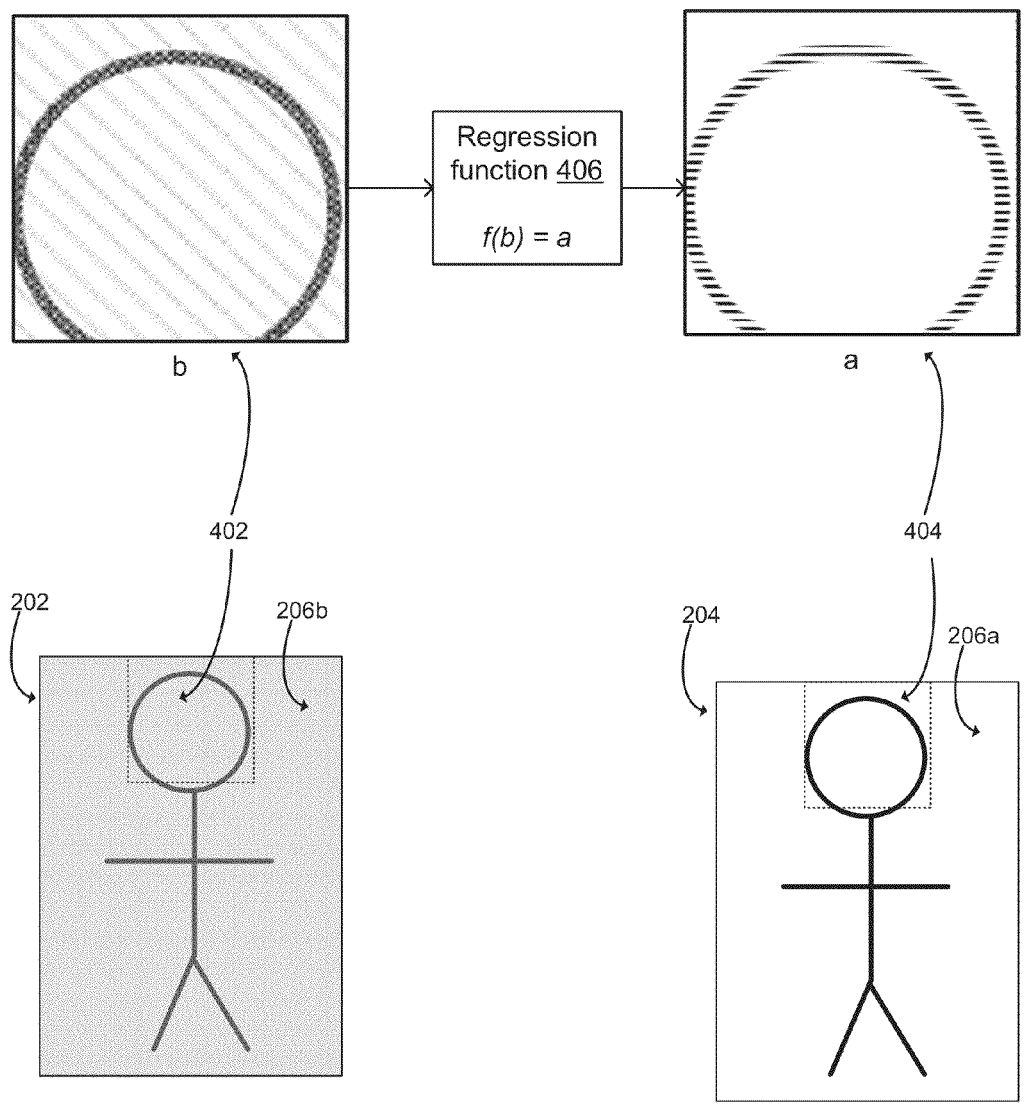
FIG. 5 is a modeling diagram depicting an example relationship between a training input patch and a training output patch.

FIG. 5 is a modeling diagram depicting an example relationship between a training input patch 402 and a training output patch 404. For a training input image 202 that is a noisy version of the training output image 204, the training module 118 can determine a regression function 406 modeling the relationship between the training input patch 402 and the training output patch 404. The regression function 406 is depicted in FIG. 5 as $f(b)=a$, where b represents the training input patch 402 and a represents the training output patch 404.

In a non-limiting example, a training input image 202 and a training output image 204 can be divided into training input patches 302, 306 and training output patches 304, 308. The image manipulation application 116 can group one of the training input patches 302 and a corresponding one of the training output patches 304 into a respective patch pair. The image manipulation application 116 can group one of the training input patches 306 and a corresponding one of the training output patches 308 into a respective patch pair. Each patch can be represented using a numerical vector by, for example, concatenating the intensity values for the pixels in the patch. For example, a patch size of 5 pixels×5 pixels can be represented as a 25×1 vector. The training module 118 can determine or otherwise learn relationship parameters represented by a regression function 406 that maps a vector representing each training input patch to a vector representing a corresponding training output patch. In one non-limiting example, the training module 118 can determine a relationship matrix represented by a linear regression function 406. The process can be repeated to find regression functions for vectors representing multiple training patch pairs. The testing module 120 can use the regression functions to remove noise or other distortion from a new input image received by the image manipulation application 116.

As depicted in FIGS. 3-4, an image can be divided into multiple overlapping patches. Each of multiple overlapping patches for an input image can be associated with different regression functions learned or otherwise determined by the training module 118. For an input image portion that includes multiple overlapping input patches associated with multiple regression functions, the testing module 120 can apply each regression function to the input image portion to obtain multiple predicted output patches for the image portion. The testing module 120 can average the multiple predicted output patches to obtain a clean version of the image portion.

Figure 6:
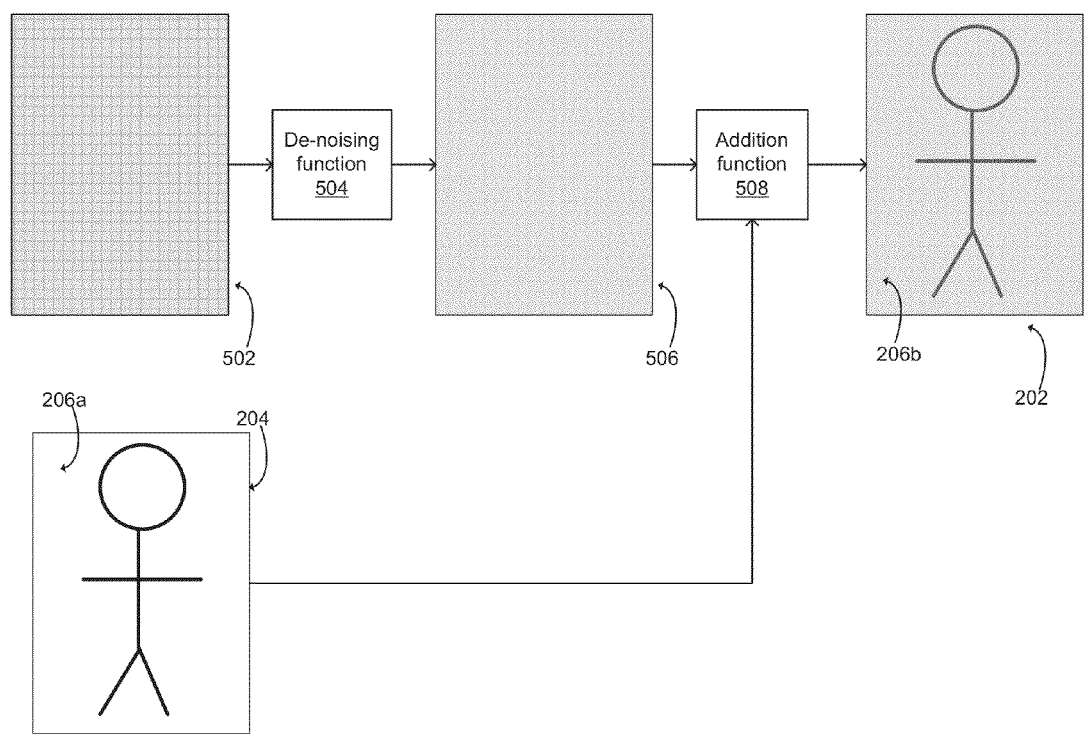
FIG. 6 is a modeling diagram depicting an example process for generating a training input image.

The noise to be added to a clean image can be obtained by applying a de-noising algorithm to a noisy input image, such as a uniform test image, to obtain a clean image and subtracting the clean image from the noisy input image. For example, FIG. 6 is a modeling diagram depicting an example process for generating a training input image 202.

In some embodiments, the noise 506 can be real noise obtained by using a low-quality imaging device, such as a camera having an image sensor that is sensitive to noise. A uniform image 502 can be captured using an imaging device that adds noise or other distortion onto captured image content. The uniform image 502 can be, for example, a white surface having uniform content throughout the image. The training output image 204 can be captured using an imaging device that adds little or no noise or other distortion onto the captured image content 206a.

A de-noising function 504 can be applied to the uniform image 502 to extract the noise 506 from the image 502. Although the noise 506 is depicted for simplicity in FIG. 6 as a series of diagonal lines, the noise 506 can include random distortion of the uniform image 502. The noise 506 and the training output image 204 can be provided as inputs to an addition function 508. The addition function 508 can distort the image content 206a using the noise 506 to generate the training input image 202.

In other embodiments, synthetic noise, such as (but not limited to) Gaussian noise can be added to image content 206a of a training output image 204 to obtain a training input image 202.

In additional or alternative embodiments, a high-quality imaging device can be used to capture a training output image 204 and a low-quality imaging device can be used to capture a training input image 202. The high-quality imaging device and the low-quality imaging device can capture an image of the same object, such as the figure depicted in training input image 202 and training output image 204. The training input image 202 and the training output image 204 can be registered together such that pixels corresponding to the same object in each image are aligned with one another. In cases where pixel-level registration is difficult due to the light, scale, rotation, or other slight differences between the images generated by a low-end camera and a high-end camera, embodiments can be used that do not involve pixel-level registration.

Figure 7:
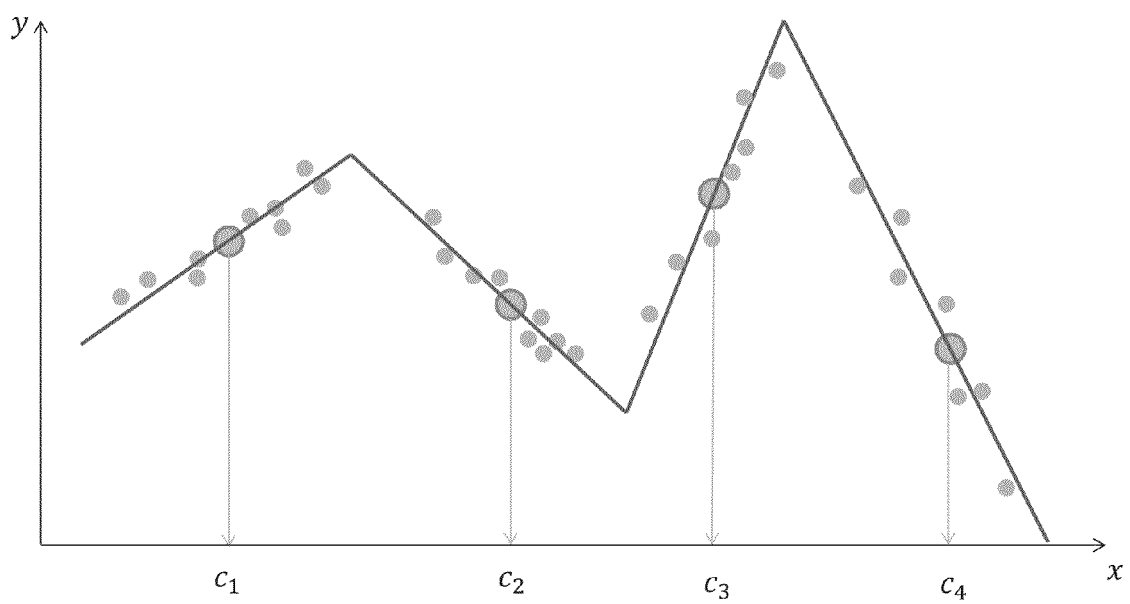
FIG. 7 is a graph depicting the selection of a subset of training input patches as anchor points.

The training module 118 can use training input patches 302, 306 and training output patches 304, 308 to determine one or more patch-pair functions, as depicted in FIGS. 6-7. FIG. 7 is a graph depicting the selection of a subset of training input patches as anchor points. Each of the training input patches is depicted in a two-dimensional space represented by the x-y axes. The anchor points $c_1 \ldots c_4$ can correspond to the centroids of the training input patches as depicted in the x-y plane. A centroid can be a point in a two-dimensional space that is the geometric center for the two-dimensional space. At each layer of recursion, the centroid for each bisected region can be selected as an anchor point for the training input patches in the bisected region. FIG. 7 depicts anchor points $c_1 \ldots c_4$ determined for a single layer of clustering.

Figure 8:
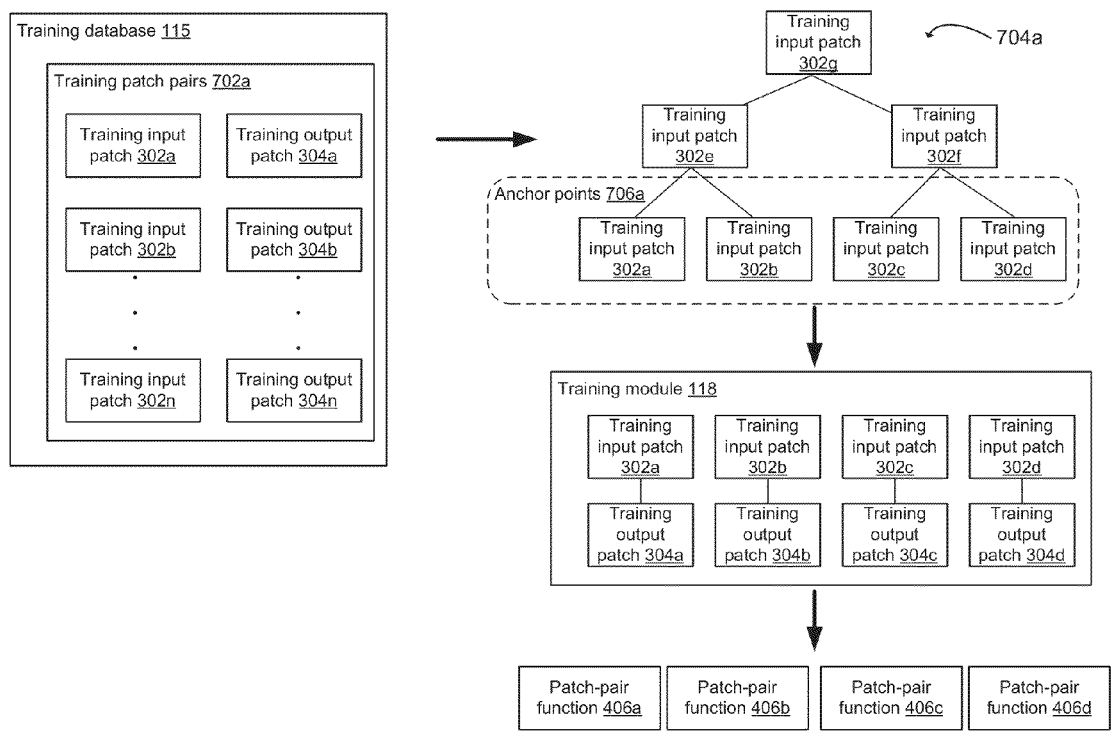
FIG. 8 is a modeling diagram depicting a selection of anchor points by clustering training input patches using a hierarchy.
Figure 9:
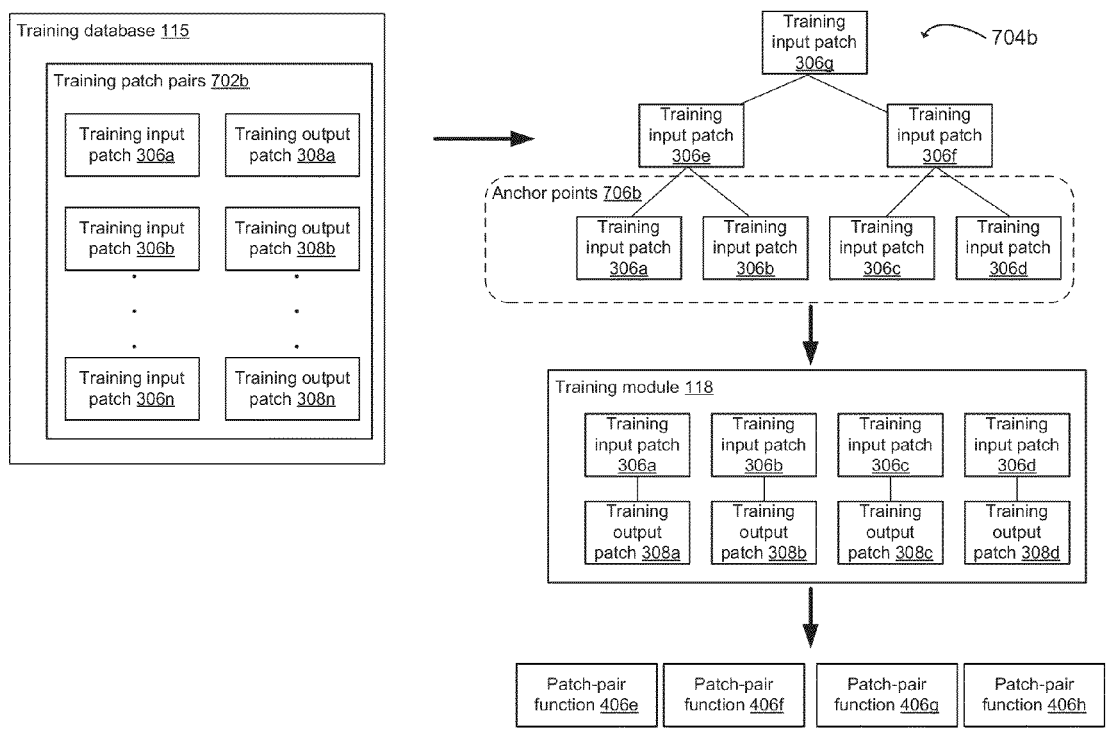
FIG. 9 is a modeling diagram depicting a selection of anchor points by clustering training input patches using a hierarchy.

FIGS. 8-9 are modeling diagrams depicting a selection of anchor points using different hierarchies. FIG. 8 is a modeling diagram depicting a selection of anchor points 706a by clustering training input patches 302a-n using a hierarchy 704a. The image manipulation application 118 can access the training patch pairs 702a from the training database 115. The training patch pairs 702a can include the training input patches 302a-n corresponding to the training output patches 304a-n.

The image manipulation application 118 can cluster the training input patches 302a-n into a hierarchy 704a using hierarchical clustering. The leaf nodes of the hierarchy 704a can be selected as the anchor points 706a. The training module 118 can determine the patch-pair functions 406a-d using the training patch pairs 302a-d and the corresponding training output patches 304a-d. The patch-pair function 406a can model the relationship between the training input patch 302a and the training output patch 304a. The patch-pair function 406b can model the relationship between the training input patch 302b and the training output patch 304b. The patch-pair function 406c can model the relationship between the training input patch 302c and the training output patch 304c. The patch-pair function 406d can model the relationship between the training input patch 302d and the training output patch 304d.

FIG. 9 is a modeling diagram depicting a selection of anchor points 706b by clustering training input patches 306a-n using a hierarchy 704b. The image manipulation application 118 can access the training patch pairs 702b from the training database 115 and generate a hierarchy 704b in a similar manner as described above with respect to training patch pairs 702a and hierarchy 704a. The training module 118 can determine the patch-pair functions 406e-h using the training patch pairs 306a-d and the corresponding training output patches 308a-d. The patch-pair function 406e can model the relationship between the training input patch 306a and the training output patch 308a. The patch-pair function 406f can model the relationship between the training input patch 306b and the training output patch 308b. The patch-pair function 406g can model the relationship between the training input patch 306c and the training output patch 308c. The patch-pair function 406h can model the relationship between the training input patch 306d and the training output patch 308d.

In a non-limiting example, the training module 118 can build a hierarchy by executing a hierarchical k-means algorithm. Using a hierarchy can account for a large variation of noisy patches in the training database 115. The hierarchical k-means algorithm can generate N centroids $(c_1, c_2, \ldots, c_N)$ for the N groups (or "clusters") of training input patches. Each centroid can be an anchor point for a respective cluster.

The root level of the hierarchy corresponds to the entire set of vectors representing the training input patches. The set of vectors representing the training input patches can include, for example, one million 25×1 vectors. The training module 118 can apply a k-means algorithm to partition the one million 25×1 vectors into groups of vectors. The training module 118 can determine a centroid for the one million 25×1 vectors represented in an x-y plane. The training module 118 can select the centroid for the one million 25×1 vectors as the root node of the hierarchy. The training module 118 can partition the x-y plane by, for example, dividing the x-y plane into four quadrants (i.e., k=4) based on the centroid. The training module 118 can determine a respective centroid for each of the four quadrants. The training module 118 can select the four centroids as child nodes of the root node. The training patches represented by vectors in the x-y plane closest to each centroid are grouped with the node corresponding to the centroid in the hierarchy such that the centroid represents the group of training patches. The training module 118 can continue recursively partitioning the x-y plane based on the centroids at each level of the hierarchy to continue generating the hierarchy. The training module 118 can cease recursion in response to the hierarchy having a number of levels corresponding to a depth factor for the hierarchy.

The training module 118 can select the leaf nodes of the hierarchy as the anchor points. The training module 118 can determine a regression function for each of the anchor points by mapping a vector representing the anchor point to a vector representing a training output patch.

For example, a training output patch, such as a clean patch, can be associated with a corresponding anchor point via an objective function such as $$f = \arg\min \Sigma_{i=1}^{K} \|x_i - \hat{x}_i\|_2^2,$$

where K represents the number of samples on the anchor point, $x_i$ represents the clean patch, and $\hat{x}_i$ represents the predicted patch.

The training module 118 can solve the objective function via any suitable means, such as (but not limited to) a least square algorithm or a non-negative least square algorithm. A least square algorithm or a non-negative least square algorithm can determine a relationship between a respective one of the training input patches falling into one group represented by an anchor point and a corresponding training output patch.

The training module can estimate $x_i$ for a least square algorithm to obtain the objective function $$f = \arg\min \Sigma_{i=1}^{K} \|x_i - B - Wy_i\|_2^2,$$

where $\hat{x}_i = f(y_i) \approx B + Wy_i$, $y_i$ is the noisy patch.

The training module 118 can estimate $x_i$ for a non-negative least square algorithm to obtain the objective function $$f = \arg\min \Sigma_{i=1}^{K} \|x_i - Wy_i\|_2^2 \, s.t., W \geq 0,$$

where $\hat{x}_i = f(y_i) \approx Wy_i$, $y_i$ is the noisy patch.

Although FIGS. 7-9 depict hierarchical clustering of training input patches, any suitable algorithm for clustering the training input patches can be used. A suitable algorithm for clustering the training input patches can partition an x-y plane in which anchors points representing respective clusters of the training input patches can be depicted and select a suitable representative vector for a cluster of training input patches. Other non-limiting examples of suitable clustering algorithms include k-means clustering, approximate k-means clustering, agglomerative clustering, etc. The suitability of a clustering algorithm can be based on the efficiency of the clustering algorithm with respect to the numbers of training input patches.

Figure 10:
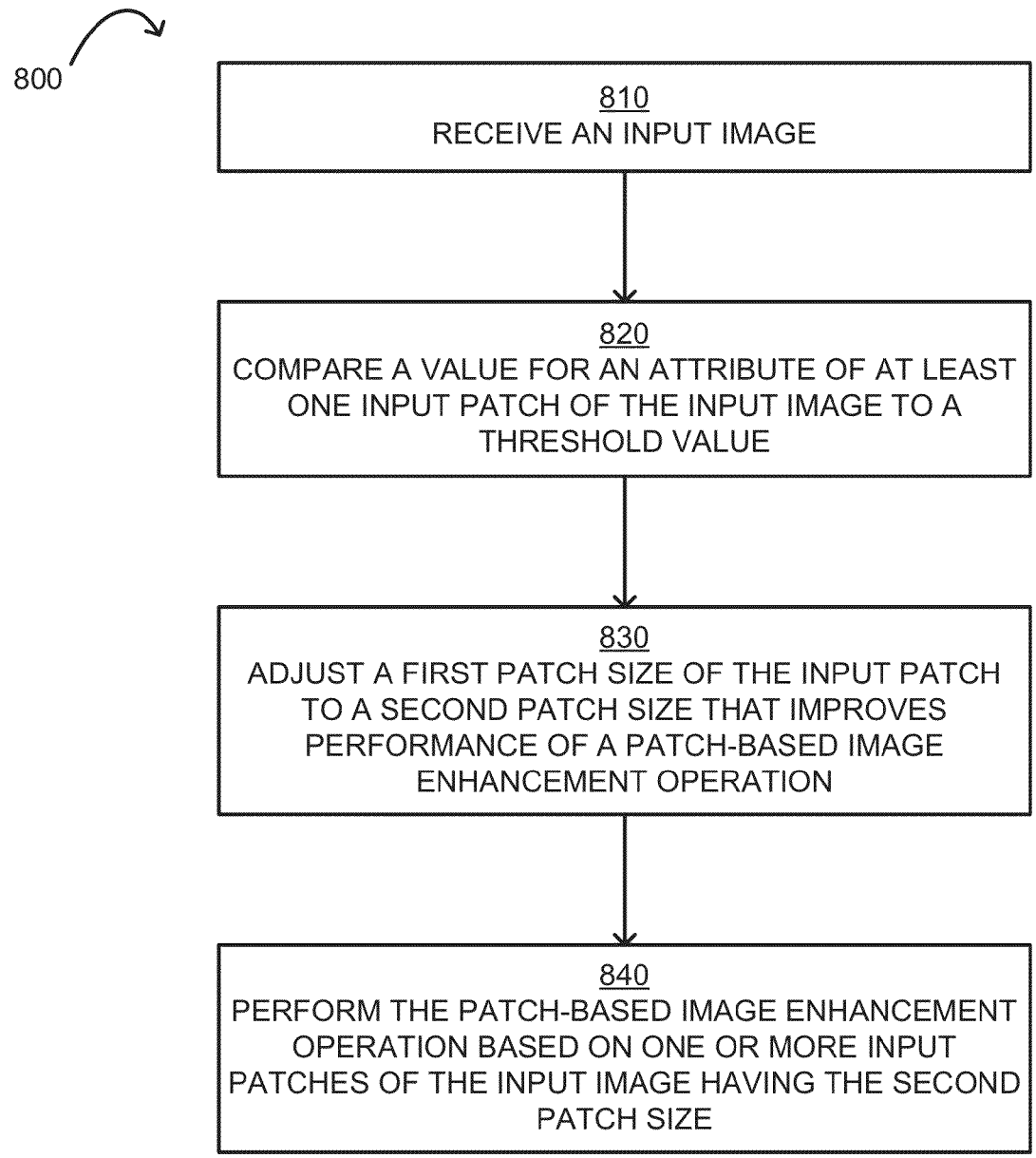
FIG. 10 is a flow chart illustrating an example method for providing patch size adaptation for patch-based image enhancement.

The image manipulation application can use patch size adaptation to select a patch size for any suitable patch-based image enhancement algorithm. FIG. 10 is a flow chart illustrating an example method 800 for using patch size adaptation for patch-based image enhancement. For illustrative purposes, the method 800 is described with reference to the system implementation depicted in FIG. 1. Other implementations, however, are possible.

The method 800 involves receiving an input image, as shown in block 810. The processor 104 of the computing system 102 can execute the image manipulation application 116 to receive the input image. In some embodiments, the input image can be captured by an imaging device 122 and provided to the processor 104. In other embodiments, the processor 104 can access an input image stored in the memory 108.

The method 800 involves comparing a value for an attribute of at least one input patch of the input image to a threshold value, as shown in block 820. The processor 104 of the computing system 102 can execute the image manipulation application 116 or another application or software module to compare a value for an attribute of the input patch to the threshold value.

In some embodiments involving learned piece-wise patch regression for image enhancement, such as embodiments described in U.S. patent application Ser. No. 13/691,190, the threshold value can be a threshold distance between an input patch and a closest anchor point. The "closest" anchor point can be an anchor point identified by traversing a hierarchical tree used to cluster training input patches of a given patch size. Decreasing the distance between an input point an a closest anchor point can improve the performance of a patch-pair function identified using the anchor point. The distance between the input patch and the anchor point can be the distance between the input patch and the anchor point as represented by vectors in an x-y plane or other Euclidean space. A threshold value can be a threshold distance. The threshold distance can be a sufficiently close distance that applying a patch-pair function to the anchor point can provide an output patch for the output image having a predefined level of quality. The image manipulation application 116 can identify the corresponding anchor point for a given input patch by any suitable process. For example, the image manipulation application 116 can traverse a hierarchy 704a by executing a nearest-neighbor search algorithm with respect to the input patch (such as, but not limited to, an exact nearest-neighbor search or an approximate nearest-neighbor search) to output a leaf node of the hierarchy 704a that is an anchor point corresponding to the input patch.

In other embodiments involving non-local means de-noising algorithms or BM3D algorithms, the threshold can be a threshold number of similar patches near a target patch. The similarity between a target patch and nearby patches can be an attribute for analyzing an input patch prior to performing a non-local means de-noising algorithm or a BM3D algorithm. The image manipulation application 116 can search for a number of patches having similar pixel values.

In additional or alternative embodiments, the image manipulation application can determine a threshold based on intrinsic properties of the patches. A non-limiting example of an intrinsic property is whether a patch is a uniform image region or a highly textured image region.

The method 800 further involves adjusting a first patch size of the input patch to a second patch size that improves performance of a patch-based image enhancement operation as compared to the first patch size, as show in block 830. The processor 104 of the computing system 102 can execute the image manipulation application 116 to determine that the first patch size of the input patch is insufficient based on comparing the value for the attribute to the threshold value.

In some embodiments involving learned piece-wise patch regression for image enhancement, such as embodiments described in U.S. patent application Ser. No. 13/691,190, the image manipulation application 116 can determine that the distance between the input patch and a closest anchor point is greater than a threshold distance.

In other embodiments involving non-local means de-noising algorithms or BM3D algorithms, the image manipulation application 116 can compare the number of similar patches to the threshold value. If the image manipulation application 116 finds a number of larger patches having similar pixel values that is greater than a threshold number, the image manipulation application 116 can de-noise the target patch by executing a non-local means de-noising algorithm or a BM3D algorithm. If the image manipulation application 116 finds a number of larger patches having similar pixel values that is less than a threshold number, the image manipulation application 116 can sub-divide the input image into input patches using a smaller patch size. The smaller patch size can be sufficient to allow the number of nearby patches having similar pixel values to exceed the threshold value. The image manipulation application 116 can de-noise the target patch by executing a non-local means de-noising algorithm or a BM3D algorithm using the input patches having the smaller patch size.

The processor 104 of the computing system 102 can execute the image manipulation application 116 to select the second patch size. In one non-limiting example involving learned piece-wise patch regression, a first hierarchy 704a can be generated using the first patch size and a second hierarchy 704b can be generated using the second patch size. The image manipulation application 116 can determine that the distance between the input patch and a corresponding anchor point determined by traversing the first hierarchy 704a is greater than a threshold distance. The image manipulation application 116 can identify a different anchor point by traversing the second hierarchy 704b.

The method 800 further involves performing a patch-based image enhancement operation the patch-based image enhancement operation based on one or more input patches of the input image having the second patch size, as shown in block 840. The processor 104 of the computing system 102 can execute the image manipulation application 116 to perform the patch-based image enhancement operation.

In some embodiments, the image manipulation application 116 divides the input patch into multiple sub-divided input patches. Each of the sub-divided input patches has the second patch size. The image manipulation application 116 performs the patch-based image enhancement using one or more of the sub-divided input patches.

A non-limiting example of performing patch-based image enhancement using piece-wise patch regression is described in U.S. patent application Ser. No. 13/691,190. An input patch equal in size to each of the training input patches 302 can be divided into sub-divided input patches. Each of sub-divided input patches can have a size equal to each of the training input patches 306. The image manipulation application 116 can determine a corresponding anchor point for each of the sub-divided input patches by traversing the hierarchy 704b. For each of the sub-divided input patches, the image manipulation application 116 can select an anchor point corresponding to the sub-divided input patch. The image manipulation application 116 can select a corresponding anchor point by generating a vector for representing the sub-divided input patch in an x-y plane or other Euclidean space. The image manipulation application 116 can identify a patch-pair function corresponding to the anchor point. The image manipulation application 116 can apply patch-pair function based on the sub-divided input patch.

In other embodiments, the image manipulation application 116 partitions an image region of the input mage into multiple input patches. Each of the input patches from the image region has the second patch size. The image manipulation application 116 performs the patch-based image enhancement using the input patches from the image region.

In a non-limiting example involving non-local means de-noising algorithms or BM3D algorithms, the image manipulation application 116 partitions an image region including the at least one input patch into multiple sub-divided input patches. A respective number of similar patches near each of the plurality of sub-divided input patches is greater than or equal to the threshold number of similar patches. For each of the sub-divided input patches, the image manipulation application 116 executes a non-local means de-noising algorithm or a BM3D algorithm based on respective similar patches near the sub-divided input patch. A non-local means algorithm can select an estimated pixel value for a center pixel of each sub-divided patch. Each estimated pixel value can be a weighted average of the pixel values for center pixels of nearby patches. A BM3D algorithm can select estimated pixel values for each target sub-divided patch via using a three-dimensional block transform from a group of sub-divided patches similar to the target patch.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
    receiving, by an image manipulation application executed by a processing device, an input image;
    comparing, by the image manipulation application, a value for an attribute of at least one input patch of the input image to a threshold value, wherein the value for the attribute is indicative of at least one of (i) a similarity between the at least one input patch and an adjacent patch and (ii) a variance of features within the at least one input patch;
    based on comparing the value for the attribute to the threshold value, adjusting, by the image manipulation application, a first patch size of the at least one input patch to a second patch size, wherein the second patch size improves performance of a patch-based image enhancement operation as compared to the first patch size; and
    performing, by the image manipulation application, the patch-based image enhancement operation based on one or more input patches of the input image having the second patch size.

2. The method of claim 1, further comprising:
partitioning, by the image manipulation application, a plurality of training input patches from a training input image into a first plurality of groups of training input patches based on the first patch size and second plurality of groups of training input patches based on the second patch size;
identifying, by the image manipulation application, a first plurality of anchor points for the first plurality of groups and a second plurality of anchor points for the second plurality of groups, wherein each anchor point represents a respective group of training input patches; and
determining, by the image manipulation application, a respective patch-pair function for each of the first plurality of anchor points and each of the second plurality of anchor points, wherein each patch-pair function corresponds to a modification to a respective training input patch to generate a respective training output patch for a training output image, wherein the training input image and the training output image include at least some of the same image content;
wherein the attribute for the at least one input patch comprises a distance between the at least one input patch and the threshold value comprises a threshold distance;
wherein performing the patch-based image enhancement operation based on the one or more input patches of the input image having the second patch size comprises:
sub-dividing the at least one input patch into a plurality of sub-divided input patches, wherein the one or more input patches comprise the plurality of sub-divided input patches, each of the plurality of sub-divided input patches having the second patch size,
for each of the sub-divided input patches:
identifying a respective anchor point corresponding to the sub-divided input patch,
identifying a respective patch-pair function corresponding to the respective anchor point, and
applying the respective patch-pair function based on the sub-divided input patch.

3. The method of claim 1,
wherein the threshold value comprises a threshold number of similar patches near the at least one input patch;
wherein performing the patch-based image enhancement operation based on the one or more input patches of the input image having the second patch size comprises:
sub-dividing an image region including the at least one input patch into a plurality of sub-divided input patches, wherein the one or more input patches comprise the plurality of sub-divided input patches, wherein a respective number of similar patches near each of the plurality of sub-divided input patches is greater than or equal to the threshold number of similar patches, and
for each of the plurality of sub-divided input patches, executing at least one of non-local means de-noising algorithm or a block-matching and three-dimensional filtering algorithm based on respective similar patches near the sub-divided input patch.

4. The method of claim 1, wherein the threshold value comprises a threshold similarity between the at least one input patch and the adjacent patch.

5. The method of claim 1,
further comprising receiving, by the image manipulation application, one or more pixel values corresponding to an image feature;
wherein the threshold value comprises a semantic threshold including the one or more pixel values;
wherein performing the patch-based image enhancement operation based on the one or more input patches of the input image having the second patch size comprises:
partitioning an image region of the input image into a plurality of input patches, each of the plurality of input patches having the second patch size, wherein the image region includes the image feature;
performing the patch-based image enhancement operation on the plurality of input patches.

6. The method of claim 1, wherein performing the patch-based image enhancement operation based on the one or more input patches of the input image having the second patch size comprises:
sub-dividing the at least one input patch into a plurality of sub-divided input patches, each of the plurality of sub-divided input patches having the second patch size, wherein the one or more input patches comprise the plurality of sub-divided input patches; and
performing the patch-based image enhancement operation based on each of the plurality of sub-divided input patches.

7. The method of claim 1, wherein performing the patch-based image enhancement operation based on the one or more input patches of the input image having the second patch size comprises:
partitioning at least one image region of the input image into the one or more input patches, wherein the at least one input patch includes at least some input content from the at least one image region, wherein the one or more input patches has the second patch size;
performing the patch-based image enhancement operation on the plurality of input patches.

8. A non-transitory computer-readable medium embodying program code executable by a processing device, the non-transitory computer-readable medium comprising:
program code for receiving an input image;
program code for comparing a value for an attribute of at least one input patch of the input image to a threshold value, wherein the value for the attribute is indicative of at least one of (i) a similarity between the at least one input patch and an adjacent patch and (ii) a variance of features within the at least one input patch;
program code for adjusting a first patch size of the at least one input patch to a second patch size, wherein the second patch size improves performance of a patch-based image enhancement operation as compared to the first patch size; and
program code for performing the patch-based image enhancement operation based on one or more input patches of the input image having the second patch size.

9. The non-transitory computer-readable medium of claim 8, further comprising:
program code for partitioning a plurality of training input patches from a training input image into a first plurality of groups of training input patches based on the first patch size and second plurality of groups of training input patches based on the second patch size;
program code for identifying a first plurality of anchor points for the first plurality of groups and a second plurality of anchor points for the second plurality of groups, wherein each anchor point represents a respective group of training input patches; and
program code for determining a respective patch-pair function for each of the first plurality of anchor points and each of the second plurality of anchor points, wherein each patch-pair function corresponds to a modification to a respective training input patch to generate a respective training output patch for a training output image, wherein the training input image and the training output image include at least some of the same image content;

wherein the attribute for the at least one input patch comprises a distance between the at least one input patch and the threshold value comprises a threshold distance;

wherein performing the patch-based image enhancement operation based on the one or more input patches of the input image having the second patch size comprises:

sub-dividing the at least one input patch into a plurality of sub-divided input patches, wherein the one or more input patches comprise the plurality of sub-divided input patches, each of the plurality of sub-divided input patches having the second patch size, for each of the sub-divided input patches:
identifying a respective anchor point corresponding to the sub-divided input patch,
identifying a respective patch-pair function corresponding to the respective anchor point, and
applying the respective patch-pair function based on the sub-divided input patch.

10. The non-transitory computer-readable medium of claim 8, wherein the threshold value comprises a threshold number of similar patches near the at least one input patch;

wherein performing the patch-based image enhancement operation based on the one or more input patches of the input image having the second patch size comprises:

sub-dividing an image region including the at least one input patch into a plurality of sub-divided input patches, wherein the one or more input patches comprise the plurality of sub-divided input patches, wherein a respective number of similar patches near each of the plurality of sub-divided input patches is greater than or equal to the threshold number of similar patches, and for each of the plurality of sub-divided input patches, executing at least one of non-local means de-noising algorithm or a block-matching and three-dimensional filtering algorithm based on respective similar patches near the sub-divided input patch.

11. The non-transitory computer-readable medium of claim 8, wherein the threshold value comprises a threshold similarity between the at least one input patch and the adjacent patch.

12. The non-transitory computer-readable medium of claim 8, further comprising program code for receiving one or more pixel values corresponding to an image feature;

wherein the threshold value comprises a semantic threshold including the one or more pixel values;

wherein performing the patch-based image enhancement operation based on the one or more input patches of the input image having the second patch size comprises:

partitioning an image region of the input image into a plurality of input patches, each of the plurality of input patches having the second patch size, wherein the image region includes the image feature;

performing the patch-based image enhancement operation on the plurality of input patches.

13. The non-transitory computer-readable medium of claim 8, wherein performing the patch-based image enhancement operation based on the one or more input patches of the input image having the second patch size comprises:

sub-dividing the at least one input patch into a plurality of sub-divided input patches, each of the plurality of sub-divided input patches having the second patch size, wherein the one or more input patches comprise the plurality of sub-divided input patches; and performing the patch-based image enhancement operation based on each of the plurality of sub-divided input patches.

14. The non-transitory computer-readable medium of claim 8, wherein performing the patch-based image enhancement operation based on the one or more input patches of the input image having the second patch size comprises:

partitioning at least one image region of the input image into the one or more input patches, wherein the at least one input patch includes at least some input content from the at least one image region, wherein the one or more input patches has the second patch size;

performing the patch-based image enhancement operation on the plurality of input patches.

15. A system comprising:

a processor configured to execute instructions stored in a non-transitory computer-readable medium;

wherein the instructions comprise an image manipulation application configured to perform operations comprising:

receiving an input image;

comparing a value for an attribute of at least one input patch of the input image to a threshold value, wherein the value for the attribute is indicative of at least one of (i) a similarity between the at least one input patch and an adjacent patch and (ii) a variance of features within the at least one input patch;

adjusting a first patch size of the at least one input patch to a second patch size, wherein the second patch size improves performance of a patch-based image enhancement operation as compared to the first patch size;

performing the patch-based image enhancement operation based on one or more input patches of the input image having the second patch size.

16. The system of claim 15, wherein the image manipulation application is further configured to perform additional operations comprising:

partitioning a plurality of training input patches from a training input image into a first plurality of groups of training input patches based on the first patch size and second plurality of groups of training input patches based on the second patch size;

identifying a first plurality of anchor points for the first plurality of groups and a second plurality of anchor points for the second plurality of groups, wherein each anchor point represents a respective group of training input patches; and determining a respective patch-pair function for each of the first plurality of anchor points and each of the second plurality of anchor points, wherein each patch-pair function corresponds to a modification to a respective training input patch to generate a respective training output patch for a training output image, wherein the training input image and the training output image include at least some of the same image content;

wherein the attribute for the at least one input patch comprises a distance between the at least one input patch and the threshold value comprises a threshold distance;

wherein performing the patch-based image enhancement operation based on the one or more input patches of the input image having the second patch size comprises:

sub-dividing the at least one input patch into a plurality of sub-divided input patches, wherein the one or more input patches comprise the plurality of sub-divided input patches, each of the plurality of sub-divided input patches having the second patch size, for each of the sub-divided input patches:
   identifying a respective anchor point corresponding to the sub-divided input patch,
   identifying a respective patch-pair function corresponding to the respective anchor point, and
   applying the respective patch-pair function based on the sub-divided input patch.

17. The system of claim 15,
wherein the threshold value comprises a threshold number of similar patches near the at least one input patch;
wherein performing the patch-based image enhancement operation based on the one or more input patches of the input image having the second patch size comprises:
   sub-dividing an image region including the at least one input patch into a plurality of sub-divided input patches, wherein the one or more input patches comprise the plurality of sub-divided input patches, wherein a respective number of similar patches near each of the plurality of sub-divided input patches is greater than or equal to the threshold number of similar patches, and
   for each of the plurality of sub-divided input patches, executing at least one of non-local means de-noising algorithm or a block-matching and three-dimensional filtering algorithm based on respective similar patches near the sub-divided input patch.

18. The system of claim 15,
wherein the image manipulation application is further configured to receive one or more pixel values corresponding to an image feature;

wherein the threshold value comprises a semantic threshold including the one or more pixel values;
   wherein performing the patch-based image enhancement operation based on the one or more input patches of the input image having the second patch size comprises:
   partitioning an image region of the input image into a plurality of input patches, each of the plurality of input patches having the second patch size, wherein the image region includes the image feature;
   performing the patch-based image enhancement operation on the plurality of input patches.

19. The system of claim 15, wherein performing the patch-based image enhancement operation based on the one or more input patches of the input image having the second patch size comprises:
   sub-dividing the at least one input patch into a plurality of sub-divided input patches, each of the plurality of sub-divided input patches having the second patch size, wherein the one or more input patches comprise the plurality of sub-divided input patches; and
   performing the patch-based image enhancement operation based on each of the plurality of sub-divided input patches.

20. The system of claim 15, further comprising an imaging device configured to record the input image, wherein the processor is configured to receive the input image from the imaging device.

* * * * *